(12) United States Patent
Nurminen et al.

(10) Patent No.: US 8,238,693 B2
(45) Date of Patent: Aug. 7, 2012

(54) APPARATUS, METHOD AND COMPUTER PROGRAM PRODUCT FOR TYING INFORMATION TO FEATURES ASSOCIATED WITH CAPTURED MEDIA OBJECTS

(75) Inventors: Jukka K. Nurminen, Espoo (FI); Olli Karonen, Helsinki (FI)

(73) Assignee: Nokia Corporation, Espoo (FI)

( * ) Notice: Subject to any disclaimer, the term of this patent is extended or adjusted under 35 U.S.C. 154(b) by 1364 days.

(21) Appl. No.: 11/839,794

(22) Filed: Aug. 16, 2007

(65) Prior Publication Data
US 2009/0049004 A1   Feb. 19, 2009

(51) Int. Cl.
G06K 9/36   (2006.01)
G06K 9/54   (2006.01)
G06K 9/60   (2006.01)
G06Q 30/00  (2012.01)

(52) U.S. Cl. .................. 382/286; 382/305; 705/26.1
(58) Field of Classification Search .............. 382/305, 382/286; 705/26.1
See application file for complete search history.

(56) References Cited

U.S. PATENT DOCUMENTS

| | | | |
|---|---|---|---|
| 7,016,899 B1 | 3/2006 | Stern et al. | |
| 7,171,018 B2 | 1/2007 | Rhoads et al. | |
| 7,289,806 B2 * | 10/2007 | Morris et al. | 455/432.3 |
| 7,487,112 B2 * | 2/2009 | Barnes, Jr. | 705/26.8 |
| 7,734,622 B1 * | 6/2010 | Fitzhugh | 707/722 |
| 2005/0113113 A1 * | 5/2005 | Reed | 455/456.3 |
| 2005/0162523 A1 * | 7/2005 | Darrell et al. | 348/211.2 |

FOREIGN PATENT DOCUMENTS
WO   WO 01/75884 A2   10/2001

OTHER PUBLICATIONS

Tollmar et al., "IDeixis—Image-Based Deixis for Finding Location-Based Information", In Proc. Mobile HCI, 2004, pp. 1-14.*
International Search Report for PCT/IB2008/001884 dated Feb. 23, 2009.
Pyssysalo et al., *CyPhone—Bringing Augmented Reality to Next Generation Mobile Phones*, University of Oulu, Department of Electrical Engineering, pp. 11-21, 2000.
Campbell et al., *Combining Positional Information With Visual Media*, Department of Computer Science, University of Bristol, UK, pp. 1-3, 1999.

(Continued)

*Primary Examiner* — Matthew Bella
*Assistant Examiner* — Jose M Torres
(74) *Attorney, Agent, or Firm* — Ditthavong Mori & Steiner, P.C.

(57) ABSTRACT

An apparatus, method and computer program product are provided for tying items of information to features in an area associated with a captured media object. An information provider may associate physical coordinates and temporal information with an item of information. When a media object is captured, metadata indicating the location and direction from which, and the time at which, the media object was captured, and/or, in the instance where the media object is an image, a focal and zoom setting of the device that captured the image, may be generated and stored with the media object. When the media object is viewed, this information, as well as other metadata associated with the capturing and/or reproducing of the media object, as well as the media object itself, may be used to estimate the area corresponding to the media object and to determine item(s) of information corresponding with features in the estimated area.

32 Claims, 5 Drawing Sheets

OTHER PUBLICATIONS

Microsoft Live Labs: Photosynth—What is Photosynth?; *Designs on the future—Smart Photos*; available at http://labs.live.com/photosynth/whatis/smartphotos.html; pp. 1-2, retrieved Sep. 5, 2007.

Siemens AG—Software Trends; *Creating Tomorrow's Codes*, available at http://www.siemens.com/index.jsp?sdc_p=11o1217313u20mcn1217163s5pFE; pp. 1-7, retrieved Sep. 5, 2007.

Siemens AG—Corporate Web Site; *Digital Graffitti Service*, available at http://www.siemens.com/index.jsp?sdc_p=cfi103453lmno1241443ps5uz3&sdc_sid=4150353481&sdc_bcpath=1034576.s_5%2; retrieved Sep. 5, 2007.

Thursday, Oct. 28, 2004: Mobile Media Metadata: *The Future of Mobile Imaging*, available at http://www.baychi.org/bof/mobile/20041028/; pp. 1-2, retrieved Sep. 5, 2007.

Welcome to AdSense; *Earn Money from relevant ads on your website*; available at https://www.google.com/adsense/login/en_US/?sourceid=aso&subid=ww-en-ha-adsense&medium=sem; pp. 1-2, retrieved Sep. 5, 2007.

ELBA; *Location Based Advertising*; available at www.elba.com/ELBA%20overview%20english.pdf.; pp. 1-17, 2003.

Fan et al., *Photo-to-Search: Using Multimodal Queries to Search the Web from Mobile Devices*; University of Science and Technology of China and Microsoft Research Asia; pp. 143-150, 2005.

\* cited by examiner

APPARATUS, METHOD AND COMPUTER PROGRAM PRODUCT FOR TYING INFORMATION TO FEATURES ASSOCIATED WITH CAPTURED MEDIA OBJECTS

BACKGROUND

As positioning technologies, such as Global Positioning System (GPS), Galileo positioning system (Galileo), cell-ID positioning, and the like, increasingly mature, the tagging of media objects, such as audio clips, images, and the like, with information associated with the physical location of the party capturing the media object is becoming more and more popular. Other types of metadata may also be tagged to media objects. For example, temporal metadata associated with the time at which a media object was captured may be stored or tagged to the media object. This temporal metadata, together with the positional metadata, may be used to associate captured media with events and objects in the past, present and future. As a result of the foregoing enhancements in positioning and metadata technologies, individuals are growing to expect quick and easy access to information about the places and objects in their surroundings, without having to specifically request the information or identify their location.

By adding additional sensors to electronic devices including, for example, cellular telephones, personal digital assistants (PDAs), digital cameras, or the like, additional possibilities for providing location-based information and services are created. In particular, in addition to determining the location of a party taking an image or capturing a sound (e.g., using a GPS receiver), as well as the time at which the media object was captured, it may also now be possible to determine the direction of his or her camera or microphone, the zoom level, and/or the auto focus settings. Using this information, it may be possible to estimate the three-dimensional (3D) area that is visible in the photograph or video, or the area from which a captured sound emanated. For example, Neill Campbell, Henk Muller, and Cliff Randell, in "Combining Positional Information with Visual Media," Deptartment of Computer Science, University of Bristol (UK) (hereinafter "Campbell et al.") disclose the use of "positional info" to "reconstruct the frustum of the camera (i.e., "the part of space which is covered on the visual"). According to Campbell et al., "the absolute position of the camera (for example a triple X,Y,Z or latitude, longitude, altitude) determines where the photograph was taken; the zoom, direction, pitch and roll information determines the field of view; and the focal length, with the depth of field, determines how much of the scene is on the photograph, in terms of depth." Thus, not only is it possible to know where the party capturing an image is located, but it may also now be possible to know what buildings or objects at that location are likely captured in his or her photograph or video.

One can imagine many instances where an individual may want to obtain information not only about his or her current location, but also about buildings, businesses, landmarks, and the like, in images that have been captured or from which sounds have been captured. For example, a party may be viewing a picture of a group of friends hanging out at a night club and desire to know the name of the night club, where it is located and/or what its hours of operations are. Similarly, an individual may be viewing a picture of a particular landmark (e.g., the Space Needle, in Seattle, Wash.) and desire to know more about the landmark (e.g., its history—when it was built, by whom—etc.). Likewise, an individual listening to a recording of a concert may desire to know more about the venue at which the concert was performed.

In addition to the foregoing, advertisers are constantly looking for new ways to get individuals to view their advertisements. One example of a new, and highly successful, advertisement approach is that used by Google™ (i.e., AdSense), wherein the advertisements are selected for websites based on the content of the website.

A need, therefore, exists for a way to provide individuals with access to information about places, objects or other tangible and intangible features in areas associated with the images (still or video) they are viewing or the audio files to which they are listening, as well as to provide advertisers with a way to take advantage of the new trends in positioning and metadata technologies.

BRIEF SUMMARY

In general, exemplary embodiments of the present invention provide an improvement by, among other things, providing a technique for linking or tying advertisements and other types of information to features in an area corresponding to a captured media object, such as an image or an audio file. For example, items of information may be linked to objects or places displayed in a captured image, so that an individual viewing the image can readily access this information to learn more about the objects or places displayed in the image. The features with which the advertisements or other types of information may be tied may further include, for example, past, present or future events occurring at a certain location, as well as other types of tangible and intangible items with which physical coordinates may be associated. According to one embodiment, an advertiser, or other type of information provider (e.g., a government or non-profit organization, etc.) may associate physical coordinates, as well as temporal information, with an advertisement or other item of information in the form of a website, text message, audio or video file, or the like. The physical coordinates may coincide, for example, with the location of one or more stores, restaurants, parks or other landmarks associated with the advertiser or other information provider. When an image is captured, still or video, or when an audio clip or recording is captured, metadata indicating the location of the device responsible for capturing the image or audio clip (e.g., a digital camera, a camera module operating on a cellular telephone, personal digital assistant (PDA), etc.), the time at which the media object was captured, the direction of the device, and/or, in the instance where the media object is a captured image, a focal and a zoom setting of the device, may be generated and stored with the captured media object.

When an individual (who may or may not be the same as the individual who captured the image) later reproduces the media object (e.g., views the image or outputs the audio file), this information may then be used to estimate the three-dimensional (3D) area associated with the media object. For example, where the media object is an audio file, the area associated with the media object may comprise the area from which the captured sound emanated. Alternatively, where the media object is an image, the area associated with the media object may comprise the area visible in the photograph or video. In one embodiment, the estimate may be in the form of a range of physical coordinates (e.g., latitude, longitude and altitude). This range of physical coordinates of the media object may then be compared to the physical coordinates associated with the various advertisements and other items of information to determine if an advertisement or other item of information has been linked to one of the features in the area corresponding to the media object (e.g., to an object or place displayed in the image or to an event that has, is or will be occurring at a location within the area). If so, the viewer may be provided access to the advertisement or other item of information, for example, by receiving a link to the corresponding website or the actual audio or video file or text message.

In one embodiment, the content of the item of information, or, where for example more than one item of information has been linked to the physical coordinates, the item selected and/or the order in which the items are provided, may depend, for example, on the time at which the media object was captured and/or reproduced, the location at which the media object is being reproduced, or any combination of metadata associated, for example, with the capturing and/or reproducing of the media object, the media object itself, and/or the capturer or reproducer themselves. The content and/or items selected may further depend upon any number of rules defined by the advertiser, or other information provider, that are based, for example, on the field strength of an image captured, the proximity of the viewer to the shooter of an image, the distribution path of the media object, and/or the virtual location of the viewer or reproducer, just to name a few.

In accordance with one aspect, an apparatus is provided for providing items of information that have been tied to features in an area associated with a captured media object. In one embodiment, the apparatus may include a processor that is configured to cause a reproduction of a media object having metadata associated therewith. The processor may further be configured to provide one or more items of information associated with one or more features in an estimated area corresponding to the media object, wherein the estimated area is determined based at least in part on the metadata associated with the media object.

In one embodiment, the media object may comprise an audio file, and the metadata may comprise a location and direction from which, as well as a time at which, the audio file was captured. Alternatively, in another embodiment, the media object may comprise an image, and the metadata may comprise a location from which the image was captured, as well as a direction of view at the time the image was captured and a time at which the image was captured. The estimated area corresponding to the media object in this exemplary embodiment may be an estimate of the an area visible in the image. The metadata of this exemplary embodiment may further comprise a focal and a zoom setting of a camera module at the time the image was captured by the camera module.

In another embodiment, the processor may be further configured to estimate the area corresponding to the media object, wherein estimating the area comprises determining a range of physical coordinates associated with the media object based at least in part on the metadata associated with the media object. The processor of this embodiment may be further configured to transmit the range of physical coordinates; and to receive, in response, the one or more items of information associated with one or more features in the estimated area, wherein the items of information are selected by comparing the physical coordinates associated with the media object to one or more physical coordinates associated with a respective one or more items of information.

In various embodiments, the processor may be further configured to transmit a location associated with an electronic device responsible for reproducing the media object and/or a time associated with the reproduction, wherein at least one item of information is selected based at least in part on the location associated with the electronic device or the time associated with the reproduction. In yet another embodiment, the processor may be further configured to cause the capture of an image; to determine a location from which the image was captured and a direction of view at the time the image was captured; and to associate the determined location and direction with the image as metadata.

In accordance with one aspect, a method is provided for providing items of information that have been tied to features in an area associated with a captured media object. In one embodiment, the method may include: (1) providing a media object for reproduction, the media object having metadata associated therewith; and (2) providing one or more items of information associated with one or more features in an estimated area corresponding to the media object, wherein the estimated area is determined based at least in part on the metadata associated with the media object.

In one embodiment, a computer program product may be provided that contains at least one computer-readable storage medium having computer-readable program code portions stored therein, wherein the computer-readable program code portions are configured to perform the method described above.

According to another aspect, an apparatus is provided for tying items of information to features in an area associated with a captured media object. In one embodiment, the apparatus may include a processor configured to select one or more items of information associated with one or more features in an estimated area corresponding to a media object, wherein the estimated area is determined based at least in part on metadata associated with the media object. The processor may be further configured to provide access to the one or more items of information selected.

In one embodiment, the processor may be further configured to receive the metadata associated with the media object; and to estimate the area corresponding to the media object, wherein in order to estimate the area, the processor is further configured to determine a range of physical coordinates associated with the media object based at least in part on the metadata associated with the media object. In another embodiment, the processor may be further configured to receive one or more links to a corresponding one or more items of information, as well as physical coordinates associated with respective items of information. The processor of this embodiment may further be configured to store the link and physical coordinates associated with respective items of information, such that the link is mapped to the corresponding physical coordinates. According to this embodiment, in order to select one or more items of information associated with one or more features in the estimated area corresponding to the media object, the processor is further configured to compare the physical coordinates associated with the media object to the stored physical coordinates associated with one or more items of information.

According to another aspect, a method is provided for tying items of information to features in an area associated with a captured media object. In one embodiment, the method may include: (1) selecting one or more items of information associated with one or more features in an estimated area corresponding to a media object, wherein the estimated area is determined based at least in part on metadata associated with the media object; and (2) providing access to the one or more items of information selected.

In one embodiment, a computer program product may be provided for tying items that contains at least one computer-readable storage medium having computer-readable program code portions stored therein, wherein the computer-readable program code portions are configured to perform the method described above.

In accordance with yet another aspect, an apparatus may be provided for tying items of information to features in an area associated with a captured media object. In one embodiment, the apparatus may include: (1) means for selecting one or more items of information associated with one or more features in an estimated area corresponding to a media object, wherein the estimated area is determined based at least in part on metadata associated with the media object; and (2) means for providing access to the one or more items of information selected.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Figure 1A:
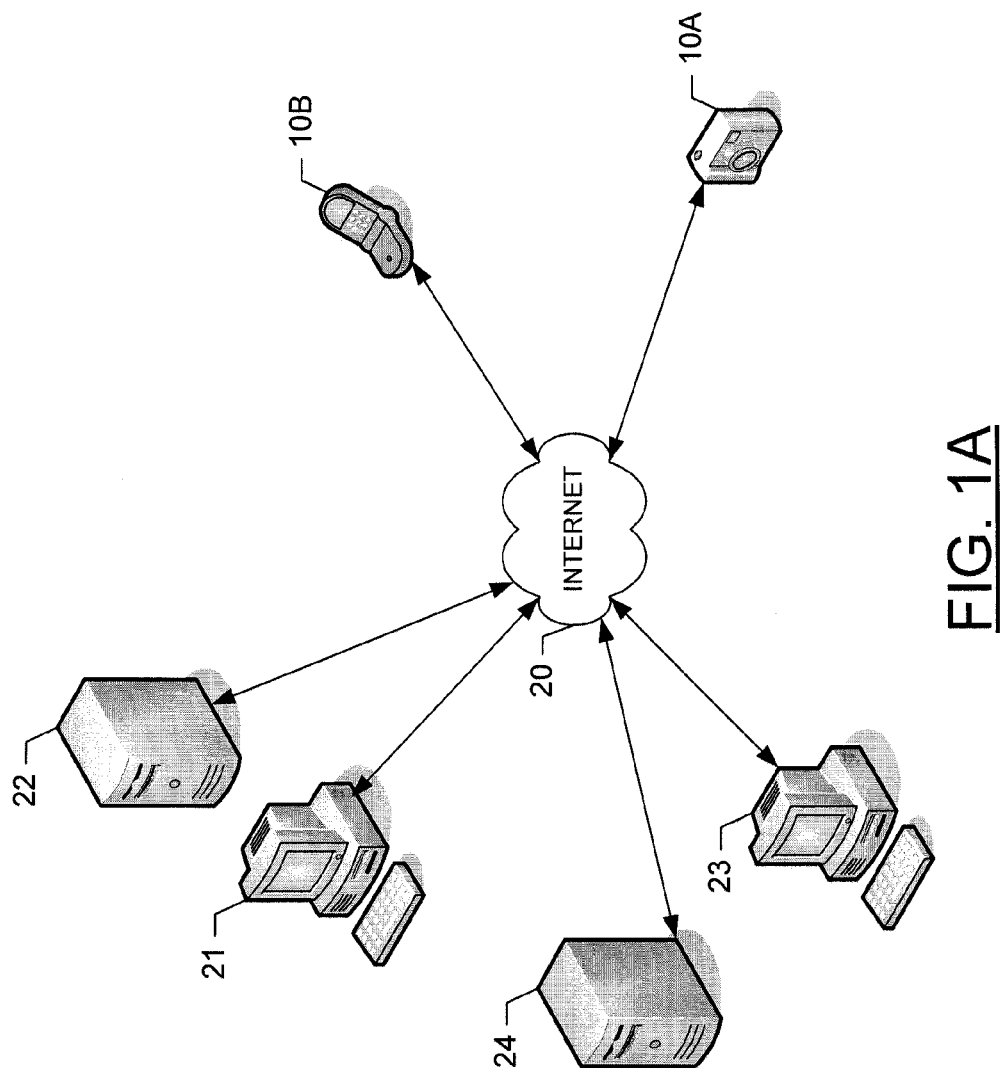
FIGS. 1A and 1B are block diagrams of systems that would benefit from embodiments of the present invention.

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

In general, embodiments of the present invention provide a way to automatically tie information and advertisements to media objects (e.g., photographs, video, audio file, etc.) and, in particular, to features in areas corresponding to those media objects. These features may include, for example, objects or places (e.g., buildings, parks, landmarks, etc.) found in the area, a past, present or future event occurring within the area, or any other tangible or intangible item capable of having physical coordinates associated therewith. In particular, as noted above, using sensors (e.g., GPS sensors, an electronic compass, gravity sensors, etc.) it may be possible to determine not only the physical location of a party capturing a media object and the time at which the media object was captured, but also the direction of the device capturing the media object and/or, in the instance where the media object is an image, the zoom setting and auto-focus setting of the camera module responsible for capturing the image. Using this information it may then be possible to estimate the three-dimensional (3D) area corresponding to the media object. This area may include, for example, the area from which a captured sound emanated or the area that is visible in a photograph or video.

Advertisers, as well as other types of information providers, may associate physical coordinates (e.g., latitude, longi- tude and altitude), as well as temporal information (e.g., period(s) of time) with their advertisements or tidbits of information. For example, a restaurant owner may purchase advertising space associated with the coordinates of each of his or her restaurant locations. Similarly, the organization responsible for providing information about the Space Needle may associate the coordinates of the Space Needle with http://www.spaceneedle.com/, a website that provides information about the Space Needle (e.g., its history, operating hours, and cost of admission). With regard to the temporal information, the advertiser or other information provider may associate certain period(s) of time with different items of information corresponding to the same physical coordinates. These periods of time may indicate which of several items of information should be provided depending, for example, on the time at which the media object corresponding with the physical coordinates was captured and/or reproduced. In general, the advertiser, or other information provider, may include any number of items of information with a set of physical coordinates and then define a set of rules for determining which item of information may be provided depending upon a number of factors (e.g., time of capture, time of reproduction, field strength, distribution path, location of reproduction, etc.)

Continuing with the above examples, according to various embodiments of the present invention, when an individual is viewing an image of either one of the advertiser's restaurants, or the Space Needle, or is listening to an audio clip captured nearby either of these locations, a link to the restaurant advertisement or the website associated with the Space Needle may be provided to the individual. Depending upon the period of time within which the media object was captured and/or reproduced, as well as, for example, the location from which the individual is viewing and/or listening to the media object, the distribution path of the media object, the field strength of a captured image, and any number of factors, a different item of information corresponding to the physical coordinates associated with the media object may be provided. In one embodiment, the user may need to press a button (e.g., an "info" button) in order to gain access to the advertisement or website. Alternatively, a link to the advertisement or website may pop up next to or on top of the image the user is viewing, enabling the viewer to actuate the link in order to access the advertisement or website.

Figure 1B:
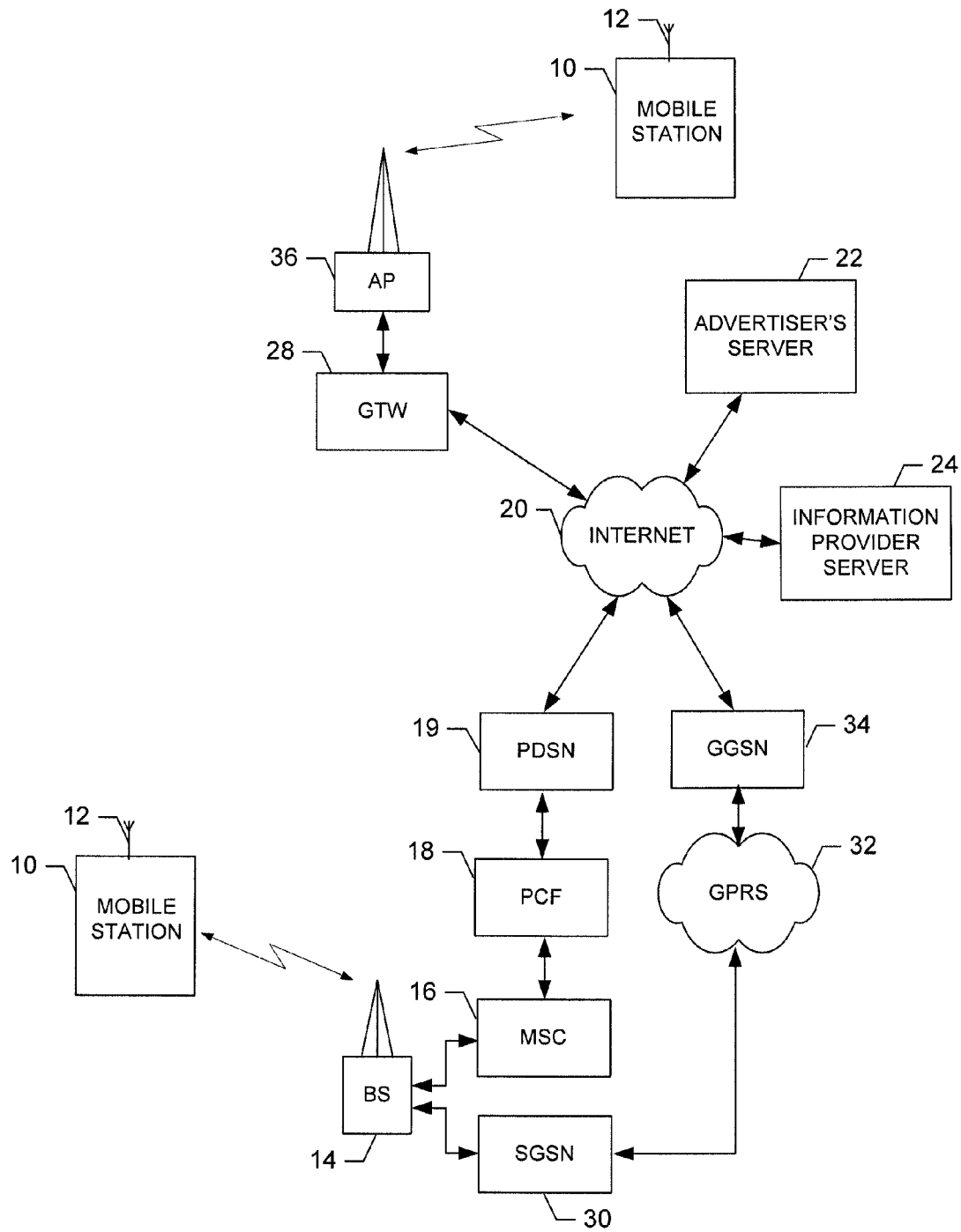

Referring to FIGS. 1A and 1B, an illustration of different types of systems that would benefit from embodiments of the present invention is provided. As shown in FIG. 1A, and as discussed above, the system may include one or more personal computers (PCs) 21, 23, laptops, or other types of electronic devices, that may be operated by advertisers or other types of information providers in order to generate items of information, such as websites, text messages, audio files, video files, and the like, including various types of information and/or advertisements. The electronic devices 21, 23 may also be used to link physical coordinates and temporal information with the items of information generated, wherein the physical coordinates are associated with various features including, for example, businesses, buildings, landmarks, events (past, present or future), or other types of tangible or intangible items or objects, with which the items of information correspond. The temporal information may indicate which of several items of information linked to a particular set of physical coordinates may apply depending, for example, on the temporal metadata associated with a captured media object.

The system may further include one or more servers 22, 24 accessible by the electronic devices 21, 23 via a communication network 20, and on which the advertisers and other information providers may store the generated items of information. These servers 22, 24, which are discussed in more detail below with regard to FIG. 2, may include means, such as a processor, for storing the items of information received along with their corresponding physical coordinates and temporal information in such a way that the physical coordinates can be searched in order to find particular items of information relating to features (e.g., objects or locations) having similar physical coordinates. While FIG. 1A illustrates a separate server 22, 24 for each advertiser and other information provider, as one of ordinary skill in the art will recognize, a single server, or similar computing device, may be used for multiple advertisers and information providers. Similarly, while the servers 22, 24 are illustrated as being accessible via the same communication network 20, as one of ordinary skill in the art will recognize the one or more servers 22, 24 may be accessible by the same or different communication network 20.

The system of one embodiment may further include an electronic device having audio and/or image capture capabilities 10A, such as a digital camera, cellular telephone having a camera module and/or microphone, or the like. This device (referred to hereinafter as the "shooter device") 10A may include means, such as a processor, for causing the capture of a media object, such as an image or audio file, and generating and storing various time, location and direction-based information relating to the media object captured as metadata associated with the media object. For example, the information may include a location of the shooter device 10A at the time the image, audio file, or other media object, was captured (e.g., in the form of Global Positioning System (GPS) data), the time at which the media object was captured, the direction of view of the image, or the direction the shooter device 10A was pointing at the time the image was captured, and/or the zoom, focal and/or flash settings of the shooter device 10A. In order to generate the time, location and direction-based information, the shooter device 10A may further include means, such as a GPS receiver, as well as various sensors (e.g., gravity sensors, Hall Effect sensors, etc.), an electronic compass, a directed microphone or speakers, and/or one or more accelerometers, or the like configured to gather the time, location and direction-based information at the time a media object is captured.

As shown, the system may further include a "viewer device" 10B including means, such as a processor, for receiving the media object (e.g., image, audio file, etc.) captured by the shooter device 10A, for example, via the communication network 20 in the form of an email, multimedia message server (MMS) message, as part of a webpage or web service, or the like, and for reproducing the media object to a user operating the viewer device 10B. The viewer device 10B may further include means for using the metadata associated with the media object in order to obtain additional information associated with the features in the area corresponding to the media object (e.g., the area from which the captured sound emanated or the area visible in the image). In particular, as is discussed in more detail below, the viewer device 10B may include means, such as a processor, for estimating the three-dimensional (3D) area corresponding to the media object based on the location and direction-based information stored as metadata associated with the media object. The viewer device 10B may further include means, such as a processor, for transmitting the estimate (e.g., in the form of a range of physical coordinates) along with other metadata associated with the media object and/or the viewer device itself to one of the servers 22, 24 via the communication network 20 in order to request the items of information that correspond to that range of physical coordinates. Alternatively, the viewer device 10B may transmit the metadata to one of the servers 22, 24, which may include means, such as a processor, to estimate the area corresponding to the media object (e.g., determine the range of physical coordinates associated with the image based on the metadata).

In either embodiment, the server 22, 24 may include means, such as a processor, for matching or comparing the range of physical coordinates associated with the media object (whether generated by the viewer device 10B or the server 22, 24) to the physical coordinates it has stored and linked to various items of information received from the advertiser or other information provider's devices 21, 23 in order to select items of information that relate to features in the estimated area (e.g., objects or places displayed in the image). The server 22, 24 may further include means, such as a processor, for then providing the viewer device 10B with access to the matching items of information, such as by transmitting a link to a website and/or transmitting the actual item of information (e.g., text message, audio file, video file, etc.)

Referring now to FIG. 1B, another type of system in which embodiments of the present invention may be implemented is illustrated. As shown, the system can include one or more mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the mobile station 10 via the Internet. For example, as discussed above with relation to FIG. 1A and below with respect to FIG. 2, the processing elements can include a server associated with an advertiser 22 and/or with other information providers 24. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be associated with one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like, as well as any future generations of mobile communication protocols, known and unknown. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, although not shown as such in FIG. 1B) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including Wireless LAN (WLAN) techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the mobile stations and the processing elements (e.g., a server associated with an advertiser 22 and/or an information provider 24) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1B, in addition to or in lieu of coupling the mobile stations 10 to one or more processing elements (e.g., a server associated with an advertiser 22 and/ or information provider 24) across the Internet 20, one or more such entities may be directly coupled to one another. As such, one or more network entities may communicate with one another in accordance with, for example, RF, BT, IrDA or any of a number of different wireline or wireless communication techniques, including LAN and/or Wireless LAN techniques. Further, the mobile station 10 and the processing elements can be coupled to one or more electronic devices, such as printers, digital projectors and/or other multimedia capturing, producing and/or storing devices (e.g., other terminals).

Figure 2:
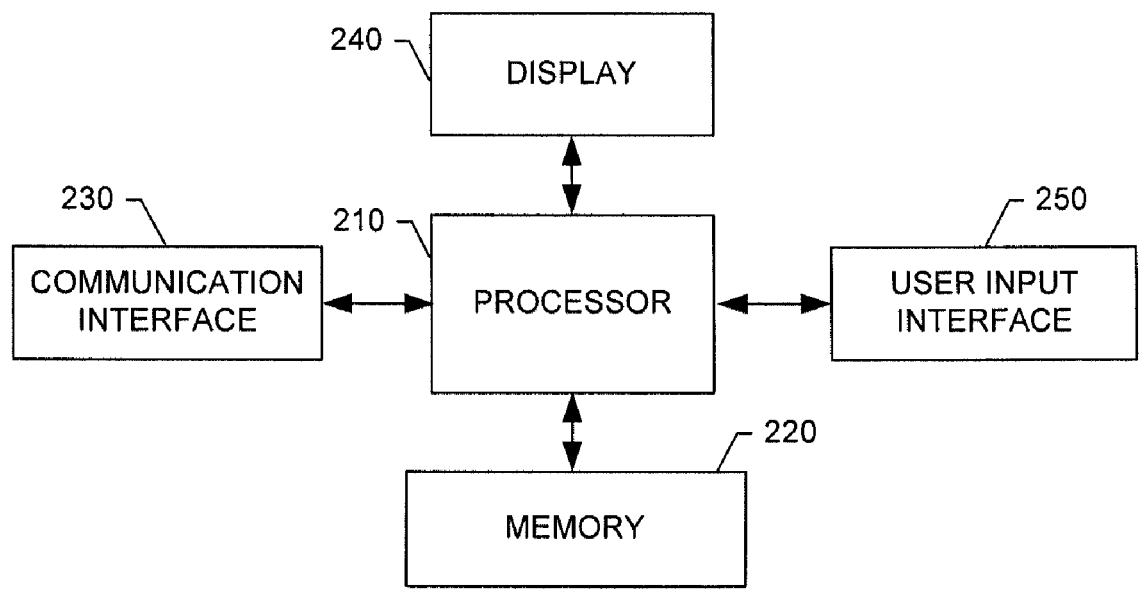
FIG. 2 is a schematic block diagram of an entity capable of operating as an advertiser's or information provider's server in accordance with embodiments of the present invention.

Referring now to FIG. 2, a block diagram of an entity capable of operating as the server associated with an advertiser 22 and/or information provider 24 discussed above is shown in accordance with one embodiment of the present invention. The entity capable of operating as a server associated with an advertiser 22 and/or information provider 24 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention.

As shown, the entity capable of operating as a server associated with an advertiser 22 and/or information provider 24 can generally include means, such as a processor 210 for performing or controlling the various functions of the entity. For example, in one embodiment, the processor may be configured to receive and store one or more links to a corresponding one or more items of information along with physical coordinates associated with respective items of information. The processor may further be configured to receive metadata associated with a media object, such as an image or audio file, including, for example, a location from which the media object was captured and a direction of view at the time the media object was captured, and to estimate an area corresponding to the media object (e.g., an area visible in the image) based at least in part on the metadata (e.g., by determining a range of physical coordinates associated with the media object). The processor may further be configured to compare the range of physical coordinates associated with the media object to the stored physical coordinates associated with one or more items of information, and to select those items of information that appear to relate to the features in the estimated area corresponding to the media object (e.g., to objects or locations displayed in the image).

In one embodiment, the processor is configured to communicate with or include memory 220, such as volatile and/or non-volatile memory that is configured to store content, data or the like. For example, the memory 220 typically stores content transmitted from, and/or received by, the entity. Also for example, the memory 220 typically stores software applications, instructions or the like for the processor to perform steps associated with operation of the entity in accordance with embodiments of the present invention.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 3:
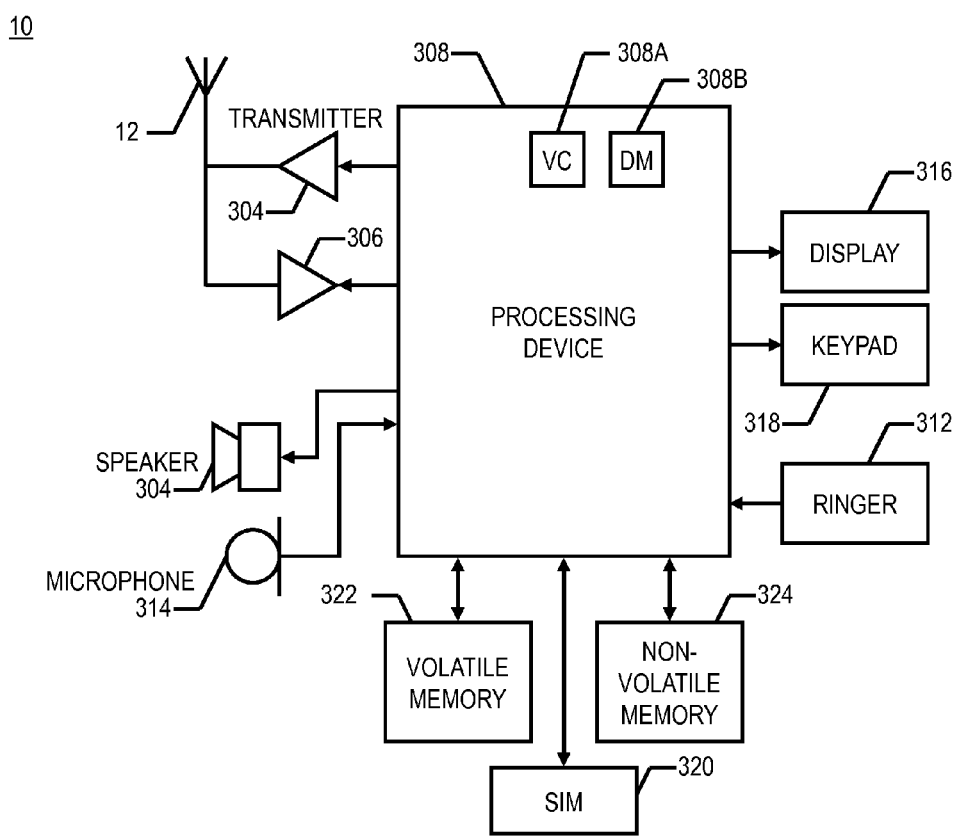
FIG. 3 is a schematic block diagram of a mobile station capable of operating in accordance with an embodiment of the present invention.

Reference is now made to FIG. 3, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that the mobile station may include alternative means for performing one or more like functions, without departing from the spirit and scope of the present invention. More particularly, for example, as shown in FIG. 3, in addition to an antenna 12, the mobile station 10 includes a transmitter 304, a receiver 306, and means, such as a processing device 308, e.g., a processor, controller or the like, that provides signals to and receives signals from the transmitter 304 and receiver 306, respectively. The processing device 308 of one embodiment may be configured to cause the capture of a media object, to determine a time at which the media object was captured, a location from which the media object was captured and a direction of view at the time the media object was captured, and to associate the determined time, location and direction with the media object as metadata. To this end, as discussed above with regard to the shooter device 10A, the mobile station 10 may include a GPS receiver, one or more sensors (e.g., gravity sensors, Hall Effect sensors, etc.), an electronic compass, a directed microphone or speaker, and/or one or more accelerometers that may be used to gather the time, location and direction-based information stored as metadata associated with the media object. In one embodiment, the processing device 308 may further be configured to cause a reproduction of the captured media object and to provide one or more items of information associated with one or more features in an estimated area corresponding to the media object (e.g., one or more objects displayed in an estimated area visible in the image), wherein the estimated area is determined based at least in part on the metadata associated with the media object. The processor may further be configured to actually estimate the area corresponding to the media object (e.g., the area visible in the image) by determining a range of physical coordinates associated with the media object.

The signals provided to and received from the transmitter 304 and receiver 306, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, may include the circuitry required for implementing the video, audio, and logic functions of the mobile station and may be capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for causing a reproduction of a media object having associated therewith time, location and direction-based metadata; and providing one or more items of information associated with one or more features in an estimated area corresponding to the media object (e.g., an estimated area visible in the image), wherein the estimated area is determined based at least in part on the metadata associated with the media object. The memory may further store computer program code for actually estimating the area corresponding to the media object by determining a range of physical coordinates associated with the media object.

The apparatus, method and computer program product of exemplary embodiments of the present invention are primarily described in conjunction with mobile communications applications. It should be understood, however, that the apparatus, method and computer program product of embodiments of the present invention can be utilized in conjunction with a variety of other applications, both in the mobile communications industries and outside of the mobile communications industries. For example, the apparatus, method and computer program product of exemplary embodiments of the present invention can be utilized in conjunction with wireline and/or wireless network (e.g., Internet) applications.

Figure 4:
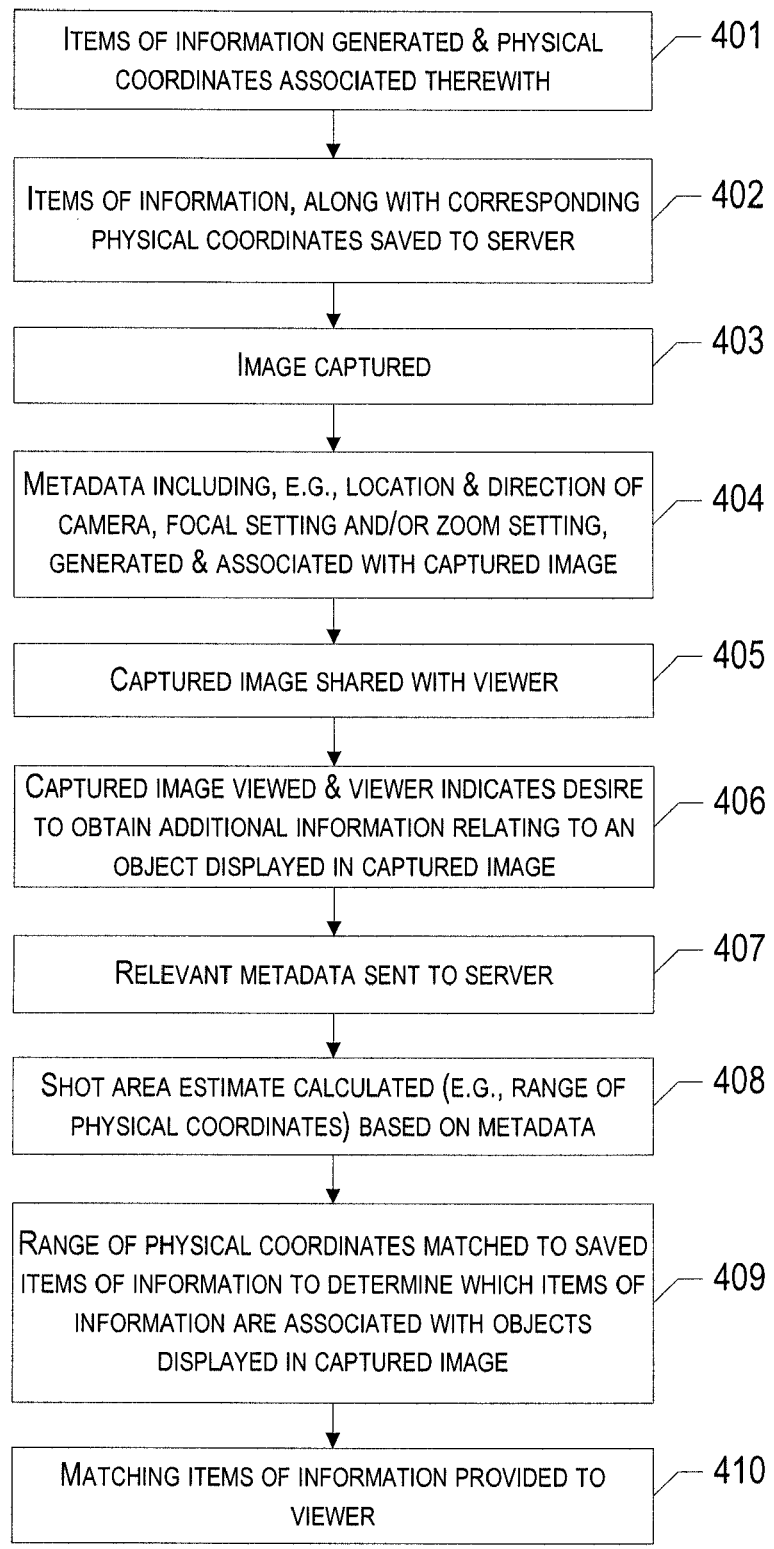
FIG. 4 is a flow chart illustrating the process of tying information and advertisements to images and objects or places displayed in those images in accordance with embodiments of the present invention.

Referring now to FIG. 4, the operations are illustrated that may be taken in order to tie items of information, such as advertisements or informational websites, to captured images, still or video, and, in particular, to features associated with an estimated area visible in a captured image. These features may include, for example, objects or locations displayed in the image, or past, present, or future events occurring at venues displayed in the image. As discussed above, and as one of ordinary skill in the art will recognize, embodiments of the present invention may likewise be used to tie information to captured audio files and, in particular, to features (e.g., objects or events) in estimated areas from which a captured sound emanated. The following description of embodiments of the present invention in relation to captured images is, therefore, provided for exemplary purposes only and should not be taken as limiting the scope of embodiments of the present invention in any way.

As shown in FIG. 4, the process of one embodiment may begin at Block 401 when an advertiser or other information provider generates an advertisement or other item of information and associates physical coordinates and, in one embodiment, temporal information, with the generated item of information. As discussed above, the item of information may be in the form of a website, text message, video or audio file, or the like, and may include information, such as an advertisement, a coupon, hours of operation of a restaurant or retail store, entry fees of a club or landmark, and the like. The physical coordinates associated with the item of information may correspond to any tangible or intangible feature with which physical coordinates are capable of being associated. This may include, for example, an object or location (e.g., restaurant, retail store, landmark, etc.) about which the information relates. The temporal information may designate which of two or more advertisements or other items of information associated with a particular set of physical coordinates should apply depending, for example, on a period of time within which a media object corresponding to those physical coordinates was captured and/or reproduced. As Block 402, the generated items of information may thereafter be saved to a server (e.g., one of the servers of FIGS. 1A and 1B above), such that the items of information are linked to their corresponding physical coordinates and temporal information.

In one embodiment, Blocks 401 and 402 may involve simply associating physical coordinates corresponding to an object of interest with an already publicly available website associated with the object of interest (e.g., www.wikipedia.org), and saving the website information and the physical coordinates, in association with each other, to the server. While embodiments of the present invention are discussed in terms of a client-server relationship between a company (e.g., an advertiser or other provider of information or content) providing advertisements or other types of information and a customer viewing those advertisements, as one of ordinary skill in the art will recognize, embodiments of the present invention could likewise be implemented in a peer-to-peer fashion, wherein individuals share images, as well as information about those images, with one another directly.

At Block 403, an individual (referred to hereinafter as the "shooter") may capture an image, still or video, using, for example, a digital camera, cellular telephone or personal digital assistant (PDA) having a camera module, or the like. The shooter's electronic device may, at Block 404, generate and store metadata associated with the captured image, wherein the metadata may include, for example, the physical location of the shooter (e.g., in the form of GPS location data), the time at which the image was captured, the direction of view at the time the image was captured (e.g., as determined through use of an electronic compass, gravity sensors, accelerometers, etc.), the camera zoom, flash and/or auto-focus settings, and the like. The shooter's electronic device may further incorporate into the metadata data that may have been acquired, for example, from a radio frequency identification (RFID) tag or Bluetooth transmitter associated with an object or item in the area captured by the image, and/or from one or more environmental sensors (e.g., humidity, temperature or ultraviolet-radiation sensors, or the like) operating on the shooter's electronic device. In general, as one of ordinary skill in the art will recognize, the metadata generated and stored in association with the captured image may include data captured or received via any number of sensors and/or input devices operating on or associated with the shooter's electronic device.

In one embodiment, the metadata may be saved as a header (e.g., Exchangeable image file format (EXIF)) or, where the image is a video, as a separate substream together with the video content (e.g., Meta content framework (MCF)). Where, for example, the image is a video, the shooter's device may store a set of metadata vectors for the video (likely used for longer videos with multiple scenes), create a single metadata vector by combining the metadata samples (likely used for shorter user-created content), or perform a combination of the two.

At some point after the image has been captured, the shooter may, in Block 405, share the image with another individual, referred to herein as the viewer. The shooter may do so, for example, by sending the image via email, multimedia message service (MMS) message, or using various services, technologies, or websites available for sharing content, such as photographs and videos (e.g., Flickr, SymTorrent, Shutterfly, etc.). The viewer may then, in Step 406, view the image on his or her electronic device (e.g., personal computer (PC), laptop, personal digital assistant (PDA), cellular telephone, etc.) and indicate his or her desire to obtain information about one or more of the features (e.g., objects, locations, events, etc.) displayed in the image. For example, the image may be of several friends hanging out at a night club, about which the viewer would like information including, for example, the night club's address, hours of operation, entry fee, and the like. In one embodiment, the viewer may indicate his or her desire to obtain information about an object or location displayed in the image by clicking, or otherwise actuating a soft or hard "information" key or button. Alternatively, in one embodiment, a link to the item of information may automatically be displayed on the image being viewed, such that the viewer need not specifically indicate his or her desire to obtain information.

In response to receiving the indication of the viewer's desire to obtain information, the viewer's device and, in particular, a processor operating on the viewer's device, may transmit the metadata associated with the image to the server on which the items of information and their corresponding physical coordinates and temporal information were saved in Block 402. (Block 407). The viewer's device may also transmit information specific to the viewer and/or the viewer's device. This may include, for example, the location of the viewer, the time at which the viewer viewed the image, the preferences (e.g., language) of the viewer, and the like. The server may, at Block 408, calculate an estimate of the three dimensional (3D) area visible in the image using the metadata stored in association with the image. In one embodiment, the server may do so, for example, by using the method described in Campbell et al. to determine a range of physical coordinates associated with the image. In another embodiment, not shown, the viewer's device and, in particular, a processor operating on the viewer's device, rather than the server, may estimate the 3D area visible in the captured image based on the location and direction-based information stored in association with the image and then transmit the range of physical coordinates, rather than the metadata, to the server.

Regardless of which entity, the viewer's device or the advertiser's/information provider's server, estimates the 3D area visible in the image, once the range of physical coordinates have been determined, the server may, at Block 409, match the range of physical coordinates against those associated with saved items of information generated and saved in Blocks 401 and 402. In other words, the server, and in particular a processor operating on the server, may query the list of saved physical coordinates to determine if any are within the range of physical coordinates associated with the captured image. If so, this may indicate that the items of information associated with those matching coordinates relate to objects, locations, or other features displayed in the captured image. In one embodiment, the server may also use the temporal metadata associated with the image, which may indicate, for example, the time at which the image was captured and/or viewed, to determine which of a number of items of information linked to physical coordinates within the range of physical coordinates associated with the media object, should be provided to the viewer. The determination may be based, for example, on the temporal information previously stored in relation to the items of information. The server may further look at additional metadata transmitted from the viewer device, such as the location of the viewer, viewer-specific preferences or information, or the like, as well as other rules and information discussed below, to select from a plurality of items of information corresponding to the physical coordinates.

The server may then, at Block 410, provide the viewer device with access to those items of information that have been selected (e.g., based on the physical coordinates, temporal metadata, viewer and viewer device specific metadata, etc.). In particular, in one embodiment, where an item of information is a website, this may involve transmitting a link to the website to the viewer device. Alternatively, where, for example, an item of information includes a text or multimedia message, an audio or video file, or the like, this may involve simply transmitting the item of information itself to the viewer's device. The viewer's device may then display the link or item of information to the viewer along with the captured image. As one of ordinary skill in the art will recognize, multiple items of information associated with a respective multiple sets of physical coordinates may fall within the range of physical coordinates associated with the captured image. In other words, the captured image may display multiple objects, locations or other features, for which items of information have been created and stored in the advertiser/information provider server. In this case, the viewer device may be provided with access to each of the applicable items of information.

While in the embodiments discussed above with reference to FIG. 4, the item of information provided to the viewer's device is primarily based on the estimation of the objects or places displayed in the captured image, in one embodiment, the items of information selected may further vary, to some extent, based on the location of the viewer at the time he or she is viewing the image. For example, the item of information may comprise an advertisement including a coupon to the restaurant shown in the image, wherein the value of the coupon depends upon how close the viewer is to the restaurant at that moment. As another example, the fee charged to the advertiser for displaying the advertisement may depend upon the location of the viewer. For example, because an individual viewing information about a London restaurant while in Finland is an unlikely customer of the restaurant, the fee charged to the restaurant advertiser may be minimal. In another embodiment, the item of information selected may depend upon a virtual location of the viewer. For example, where an image was captured of the front of a building, the viewer may request information he or she would have received had the image been captured from the side of the building. In other words, in one embodiment, the viewer may use the image as a starting point, but navigate to the left, right, or sideways, to look at information of places close to, but not necessarily in the photographed area.

Where, for example, multiple advertisements are associated with the range of physical coordinates associated with the captured image, which of the advertisements or other items of information are provided and in what order may depend upon the viewer and his or her location. Similarly, in one embodiment, the language used in the advertisement or other item of information may depend upon information known about the viewer (e.g., as taken from the viewer's device). In another embodiment, the time at which the image was captured and/or viewed may influence the advertisement and/or information displayed. In yet another embodiment, the distribution path of the media object from the party capturing the media object to the party reproducing it may influence the content of the item of information. For example, where an image is of pub or bar, the item of information provided may be different when the image is downloaded from a website campaigning against alcohol consumption than when it was received via email from a friend. Similarly, the content or item of information selected may vary depending upon the proximity of the capturer to the viewer or reproducer.

Based on the foregoing, the advertisements and other items of information provided to the viewer's device may change dynamically depending upon many different factors, all of which are likely defined by the advertiser or other information provider when creating the advertisement or other type of information and associating physical coordinates, temporal information and other types of metadata, with that item of information.

In other embodiments, an item of information, such as an advertisement, may have a predefined coverage area or field strength. For example, the advertiser or information provider defining the advertisement, or other item of information, and the rules associated therewith, may establish that the item of information should only be displayed when the image is captured from south of the corresponding physical coordinates, or only when the shooter is within some set number of meters or miles. In general, when displaying content including the captured media object, any combination of metadata relating to the capturing, the captured content, and/or the content provider's interests, may be used to determine additional information to be provided to the viewer of the captured content.

In yet another embodiment, where the identity of the shooter is recorded with the captured image, it may be possible to create a business model, whereby the shooter is rewarded in some manner if the captured image results in a "click" (e.g., a person pushing the "information" button to view additional information). In one embodiment, the shooter may even influence the kinds of advertisements will/can be shown in association with the media objects captured by the shooter.

As one of ordinary skill in the art will recognize, the objects or features with which the advertisements, or other types of information, may be linked need not be static in nature. In contrast, embodiments of the invention likewise apply to moving objects captured, for example, in a photograph or video. For example, a photograph of a bus may lead the viewer to a webpage of the bus company. In this embodiment, the advertiser's server may be required to match the estimated area visible in the image (e.g., physical coordinates) captured at time t to the instantaneous location of a dynamically moving shot target at the same time point using, for example, the route history of the bus.

Based on the foregoing, embodiments of the present invention provide a new kind of advertising, or other information, paradigm that may be tied to media objects captured by anyone. Various embodiments further provide a new search user interface that is ideally suited for mobile terminals, such as cellular telephones, wherein instead of typing the name of an object or location (e.g., Hard Rock Café or the Tower Bridge in London), a user may be able to simply snap a photograph of the object or location and then indicate a desire for additional information (e.g., by pressing the "information" button).

Embodiments of the present invention may also provide significant advantages to advertisers, by providing a new way to create and display advertisements. In particular, in one embodiment, it may be possible to count how many individuals have viewed an advertisement, requested information, and/or even sent an email, made a call to the advertiser or other information provider, or the like. In addition, embodiments of the present invention may enable an advertiser to begin creating photographs, videos and the like to attract user to access their advertisements or other types of information.

As discussed above, embodiments of the present invention could also be applied to other types of multimedia, other than video or still images. In particular, in one embodiment audio scenes may lead an individual to the appropriate information. In this exemplary embodiment, the recording may be generated using directed microphones that are able to capture the relevant "shot target" of the recording, or stereo microphones which may allow for finding the location of the dominating sound. As an example, a recording of a tiger roaring at a zoo may allow accessing the tiger pages of the zoo website. In a further embodiment, associated temporal and positional metadata of the captured audio might lead the individual to a section of the tiger pages describing the birth of tigers close to the date the audio file was recorded. Note that the organization that provided the link to the zoo webpage need not know whether the user is accessing the information based on an audio file or a captured image, as long as the media object (e.g., audio file or captured image) corresponds to the physical coordinates associated with the zoo webpage, or other item of information.

As described above and as will be appreciated by one skilled in the art, embodiments of the present invention may be configured as an apparatus or method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
at least one processor; and
at least one memory including computer program code for one or more programs, the at least one memory and the computer program code configured to, with the at least one processor, cause the apparatus to perform at least the following, cause a reproduction of a media object having metadata associated therewith;

provide one or more items of information to a mobile device associated with one or more features in a three-dimensional estimated area corresponding to the media object; and estimate the area corresponding to the media object by determining a range of three-dimensional physical coordinates associated with the media object based at least in part on the metadata associated with the media object, wherein at least one item of information comprises an advertisement associated with a feature in the estimated area.

2. The apparatus of claim 1, wherein the media object comprises an audio file and the metadata comprises a location and direction from which the audio file was captured and a time at which the audio file was captured.

3. The apparatus of claim 1, wherein the media object comprises an image, the metadata comprises a location from which the image was captured, a direction of view at the time the image was captured, and a time at which the image was captured, and the estimated area corresponding to the image comprises an estimate of an area visible in the image.

4. The apparatus of claim 3, wherein the metadata further comprises a focal and a zoom setting of a camera module at the time the image was captured by the camera module.

5. The apparatus of claim 3, wherein the apparatus is further caused to:
cause the capture of an image;
determine a location from which the image was captured and a direction of view at the time the image was captured; and
associate the determined location and direction with the image as metadata.

6. The apparatus of claim 1, wherein the apparatus is further caused to:
transmit the range of physical coordinates; and
receive, in response, the one or more items of information associated with one or more features in the estimated area, wherein the items of information are selected by comparing the physical coordinates associated with the media object to one or more physical coordinates associated with a respective one or more items of information.

7. The apparatus of claim 6, wherein the apparatus is further caused to:
transmit a location associated with the mobile device responsible for reproducing the media object, wherein at least one item of information is selected based at least in part on the location associated with the mobile device.

8. The apparatus of claim 6, wherein the apparatus is further caused to:
transmit a time associated with the reproduction of the media object, wherein at least one item of information is selected based at least in part on the time associated with the reproduction of the media object.

9. The apparatus of claim 1, wherein the one or more items of information comprise at least one of a website, a link to a website, an audio file, a video file, or a combination thereof.

10. An apparatus of claim 1, wherein a value of the advertisement is dependent upon the location of the mobile device and a location of a subject of the advertisement.

11. A method comprising:
providing a media object for reproduction, said media object having metadata associated therewith;
providing, by a processor, one or more items of information to a mobile device associated with one or more features in a three-dimensional estimated area corresponding to the media object; and
estimating the area corresponding to the media object by determining a range of three-dimensional physical coordinates associated with the media object based at least in part on the metadata associated with the media object,
wherein at least one item of information comprises an advertisement associated with a feature in the estimated area.

12. The method of claim 11, wherein the media object comprises an audio file and the metadata comprises a location and direction from which the audio file was captured and a time at which the audio file was captured.

13. The method of claim 11, wherein the media object comprises an image, the metadata comprises a location from which the image was captured, a direction of view at the time the image was captured, and a time at which the image was captured, and the estimated area corresponding to the image comprises an estimate of an area visible in the image.

14. The method of claim 11, further comprising:
transmitting the range of physical coordinates; and
receiving, in response, the one or more items of information associated with one or more features in the estimated area, wherein the items of information are selected by comparing the physical coordinates associated with the media object to one or more physical coordinates associated with a respective one or more items of information.

15. The method of claim 14 further comprising:
transmitting a location associated with the mobile device responsible for reproducing the media object, wherein at least one item of information is selected based at least in part on the location associated with the electronic device.

16. The method of claim 14 further comprising:
transmitting a time associated with the reproduction of the media object, wherein at least one item of information is selected based at least in part on the time associated with the reproduction of the media object.

17. A non-transitory computer-readable storage medium carrying one or more sequences of one or more instructions which, when executed by one or more processors, cause an apparatus to at least perform the method of claim 11.

18. An apparatus comprising:
at least one processor; and
at least one memory including computer program code for one or more programs,
the at least one memory and the computer program code configured to, with the at least one processor, cause the apparatus to perform at least the following,
select one or more items of information provided to a mobile device associated with one or more features in a three-dimensional estimated area corresponding to a media object;
estimate the area corresponding to the media object by determining a range of three-dimensional physical coordinates associated with the media object based at least in part on the metadata associated with the media object; and
provide access to the one or more items of information selected, wherein at least one item of information comprises an advertisement associated with a feature in the estimated area.

19. The apparatus of claim 18, wherein the media object comprises an audio file and the metadata comprises a location and direction from which the audio file was captured and a time at which the audio file was captured.

20. The apparatus of claim 18, wherein the media object comprises an image, the metadata comprises a location from which the image was captured, a direction of view at the time the image was captured, and a time at which the image was captured, and the estimated area corresponding to the image comprises an estimate of an area visible in the image.

21. The apparatus of claim 20, wherein the metadata further comprises a focal and a zoom setting of a camera module at the time the image was captured by the camera module.

22. The apparatus of claim 18, wherein the apparatus is further caused to:
receive one or more links to a corresponding one or more items of information;
receive physical coordinates associated with respective items of information;
store the link and physical coordinates associated with respective items of information, such that the link is mapped to the corresponding physical coordinates; and
compare the physical coordinates associated with the media object to the stored physical coordinates associated with one or more items of information for selecting the one or more items of information.

23. The apparatus of claim 22, wherein the apparatus is further caused to determine to transmit the link associated with respective items of information selected to provide access to the one or more items of information.

24. The apparatus of claim 22, wherein the apparatus is further caused to download the items of information from respective links corresponding with the items of information selected and to transmit the items of information.

25. The apparatus of claim 22, wherein the apparatus is further caused to:
receive a location associated with the mobile device reproducing the media object,
wherein in order to select one or more items of information associated with one or more features in the estimated area corresponding to the media object, the apparatus is further caused to select at least one item of information based at least in part on the location of the mobile device reproducing the media object.

26. The apparatus of claim 22, wherein the apparatus is further caused to:
receive a time associated with the mobile device reproducing the media object,
select at least one item of information based at least in part on the time of the mobile device reproducing the media object to select one or more of the items of information.

27. A method comprising:
selecting, by a processor, one or more items of information provided to a mobile device associated with one or more features in a three-dimensional estimated area corresponding to a media object;
estimating the area corresponding to the media object by determining a range of three-dimensional physical coordinates associated with the media object based at least in part on the metadata associated with the media object; and
providing access to the one or more items of information selected,
wherein at least one item of information comprises an advertisement associated with a feature in the estimated area.

28. The method of claim 27, wherein the media object comprises an audio file and the metadata comprises a location and direction from which the audio file was captured and a time at which the audio file was captured.

29. The method of claim 27, wherein the media object comprises an image, the metadata comprises a location from which the image was captured, a direction of view at the time the image was captured, and a time at which the image was captured, and the estimated area corresponding to the image comprises an estimate of an area visible in the image.

30. The method of claim 27, further comprising:
receiving one or more links to a corresponding one or more items of information;
receiving physical coordinates associated with respective items of information; and
storing the link and physical coordinates associated with respective items of information, such that the link is mapped to the corresponding physical coordinates,
wherein selecting one or more items of information associated with one or more features in the estimated area corresponding to the media object comprises comparing the physical coordinates associated with the media object to the stored physical coordinates associated with one or more items of information.

31. A non-transitory computer-readable storage medium carrying one or more sequences of one or more instructions which, when executed by one or more processors, cause an apparatus to at least perform the method of claim 27.

32. An apparatus comprising:
means for selecting one or more items of information provided to a mobile device associated with one or more features in a three-dimensional estimated area corresponding to a media object;
means for estimating the area corresponding to the media object by determining a range of three-dimensional physical coordinates associated with the media object based at least in part on the metadata associated with the media object; and
means for providing access to the one or more items of information selected,
wherein at least one item of information comprises an advertisement associated with a feature in the estimated area.

* * * * *